(No Model.) 7 Sheets—Sheet 1.
F. N. TURNEY.
APPARATUS FOR EXTRACTING FAT FROM WOOL.
No. 573,727. Patented Dec. 22, 1896.
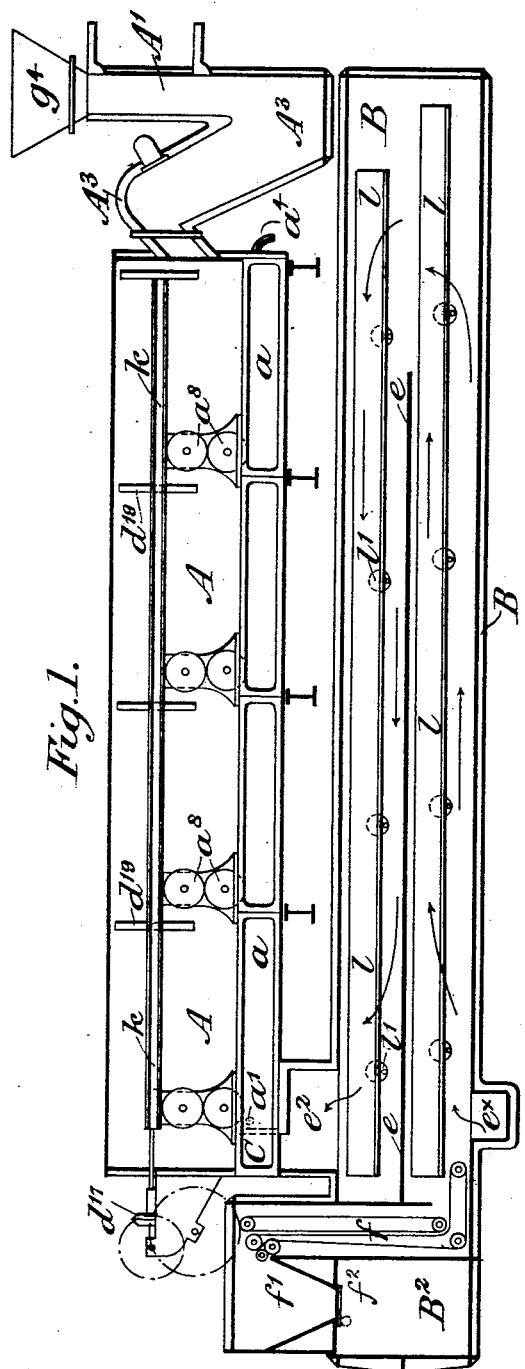

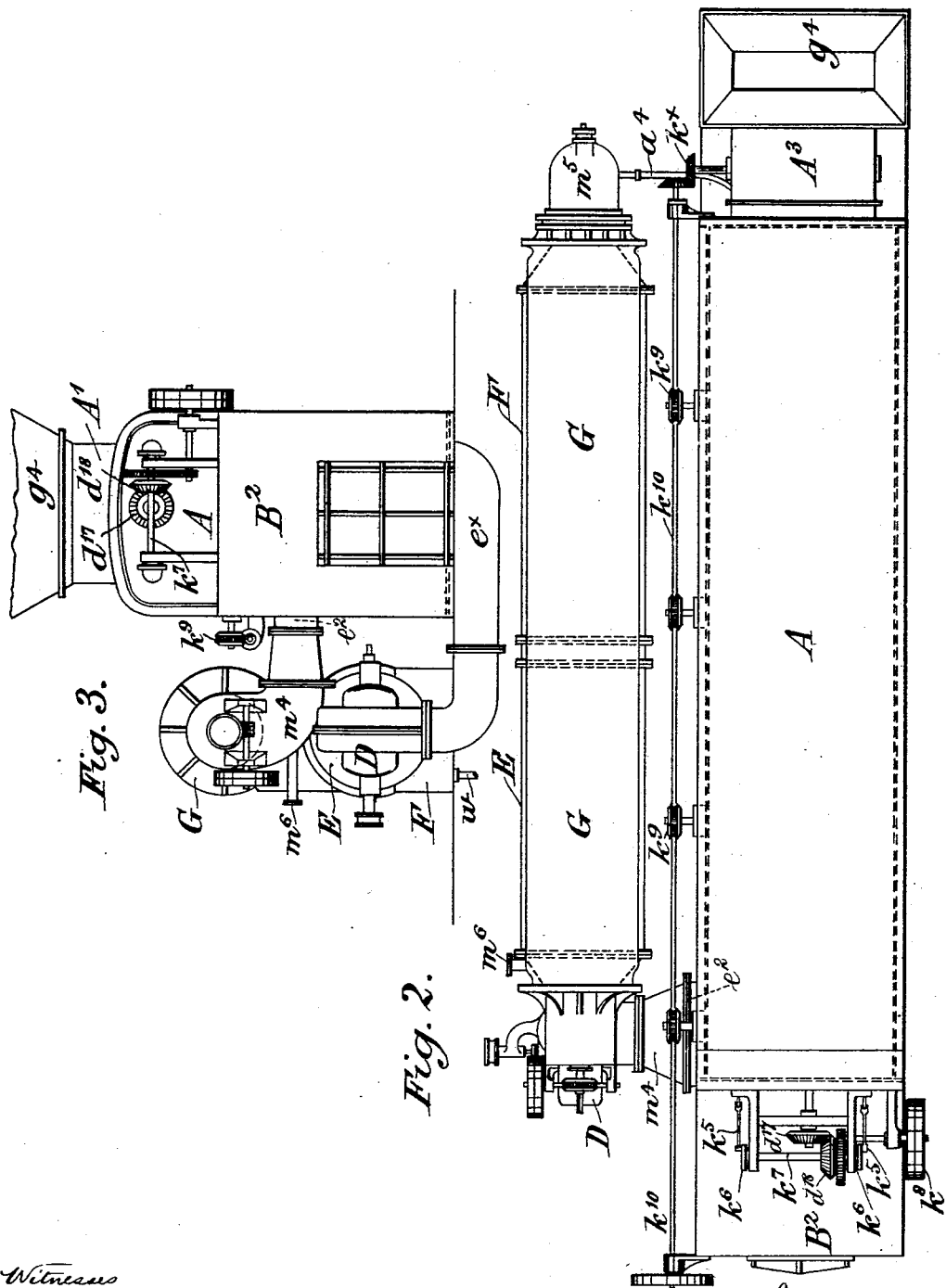

(No Model.) 7 Sheets—Sheet 3.
F. N. TURNEY.
APPARATUS FOR EXTRACTING FAT FROM WOOL.
No. 573,727. Patented Dec. 22, 1896.
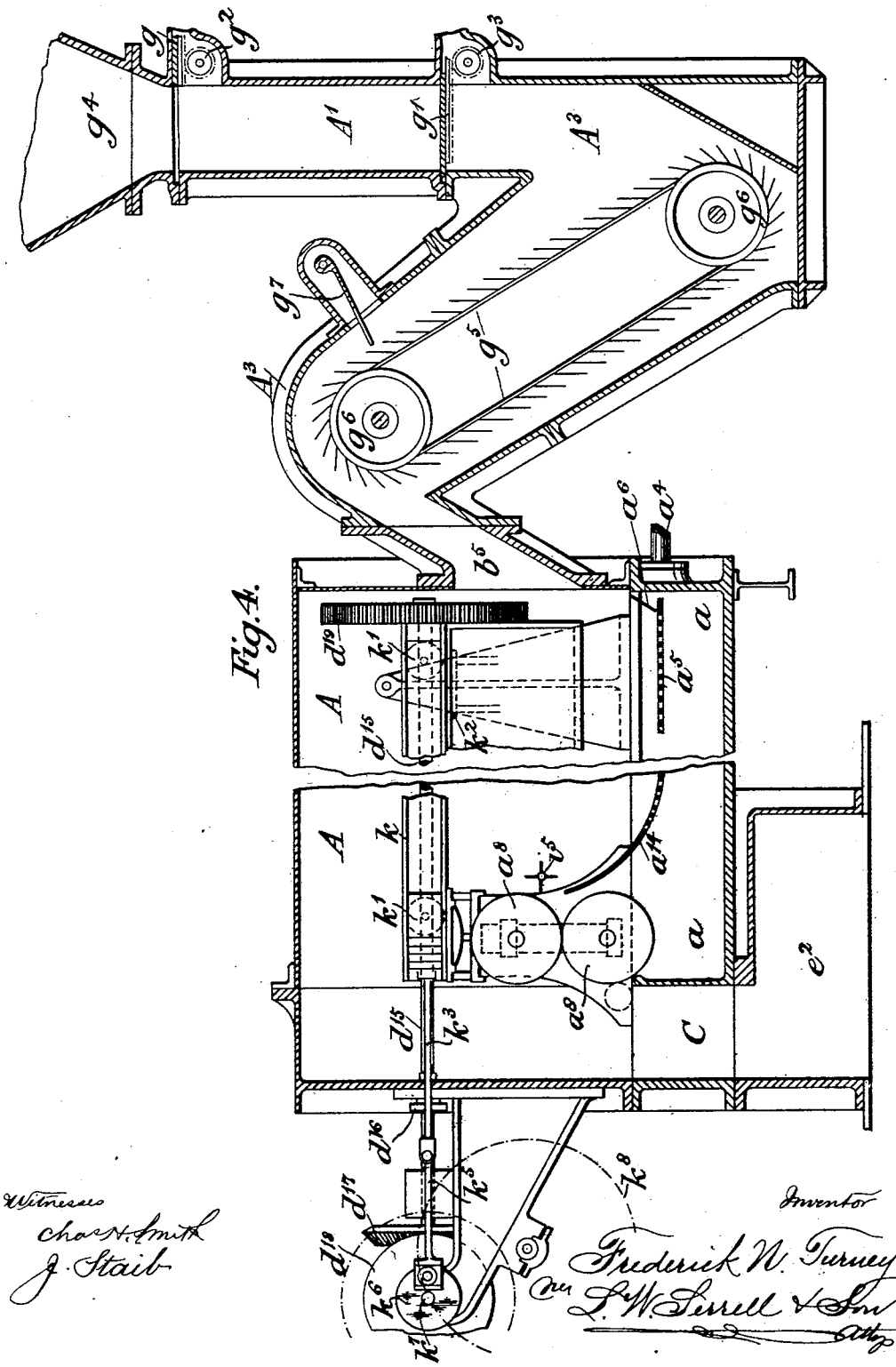

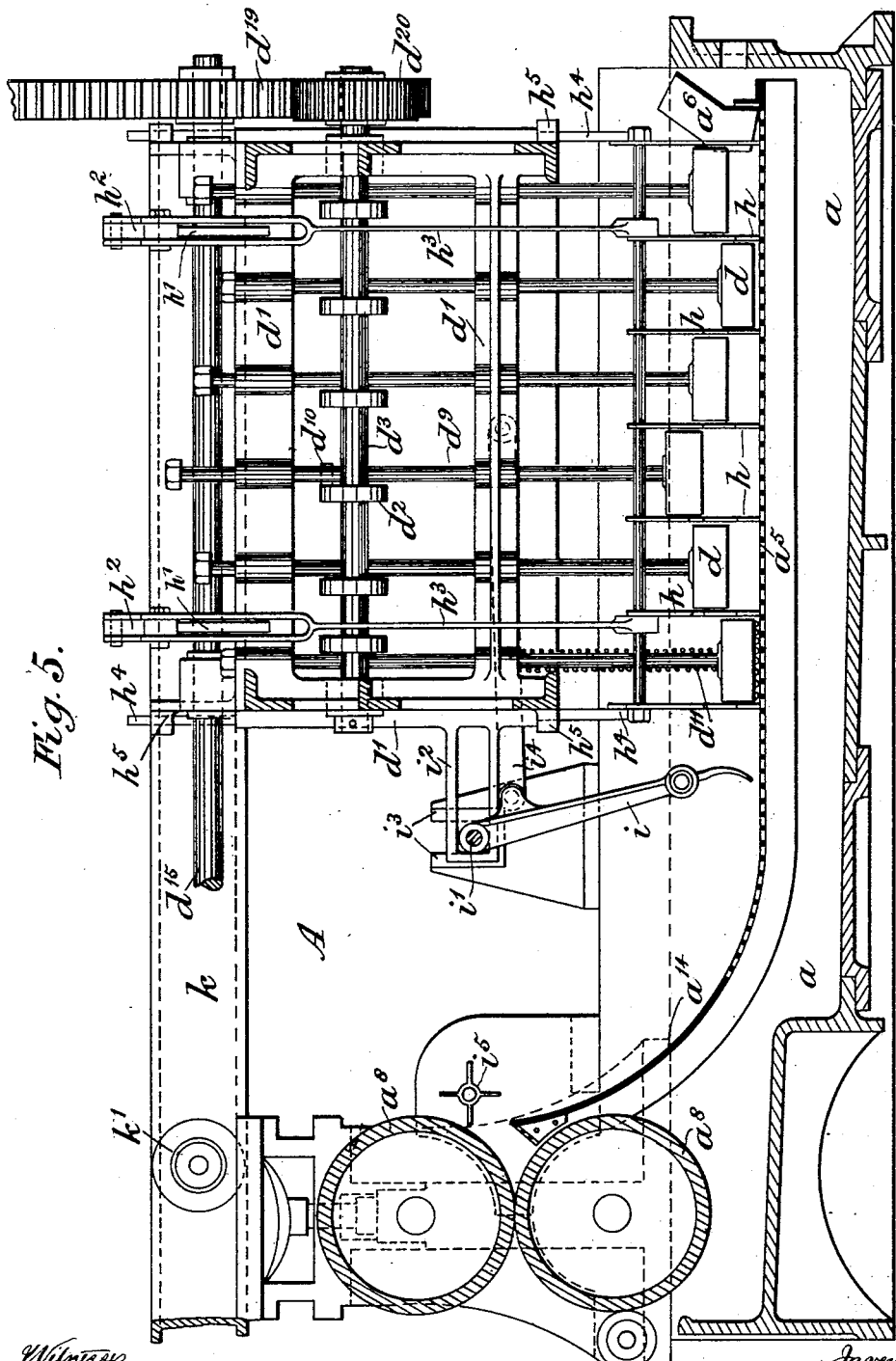

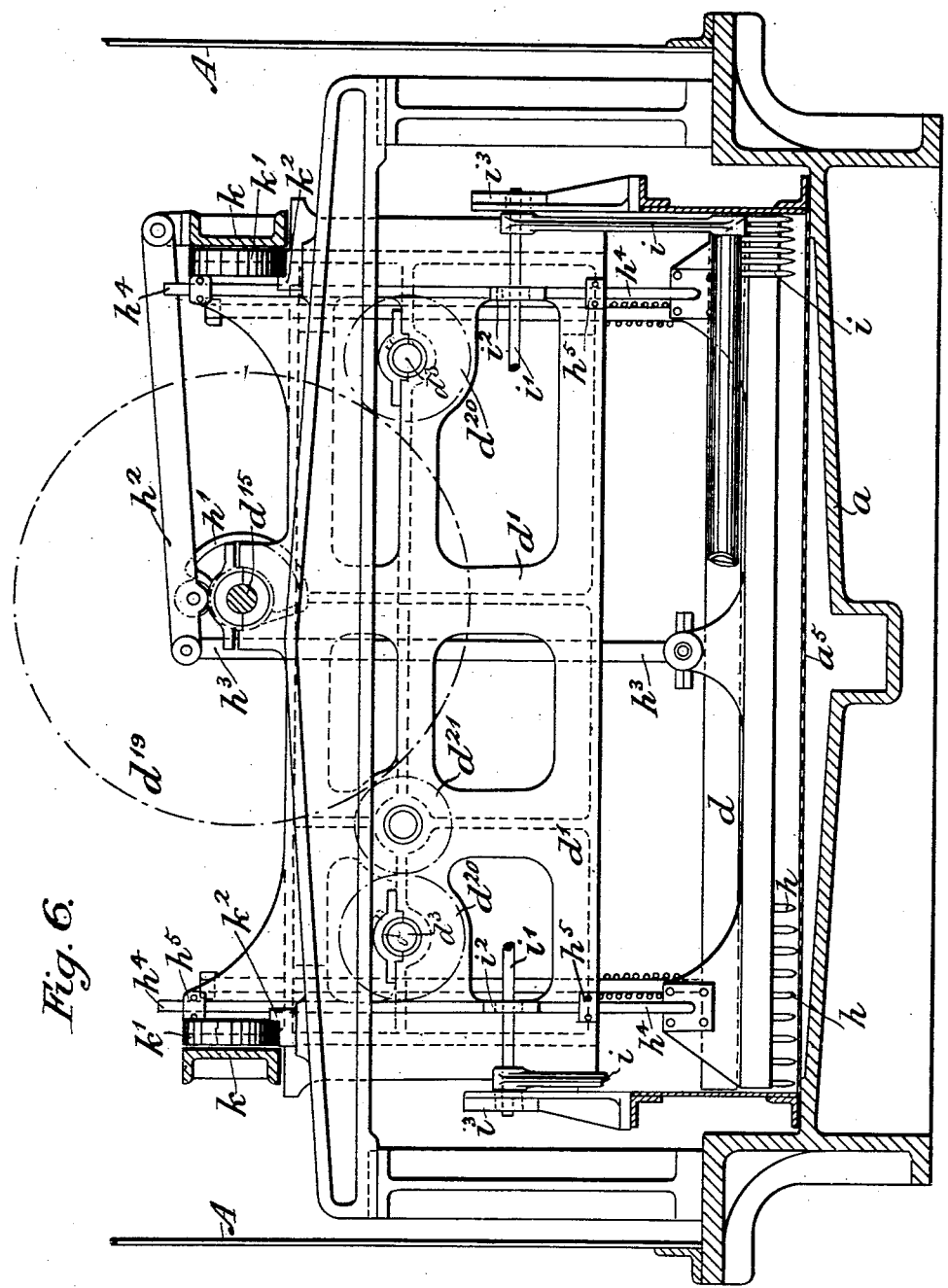

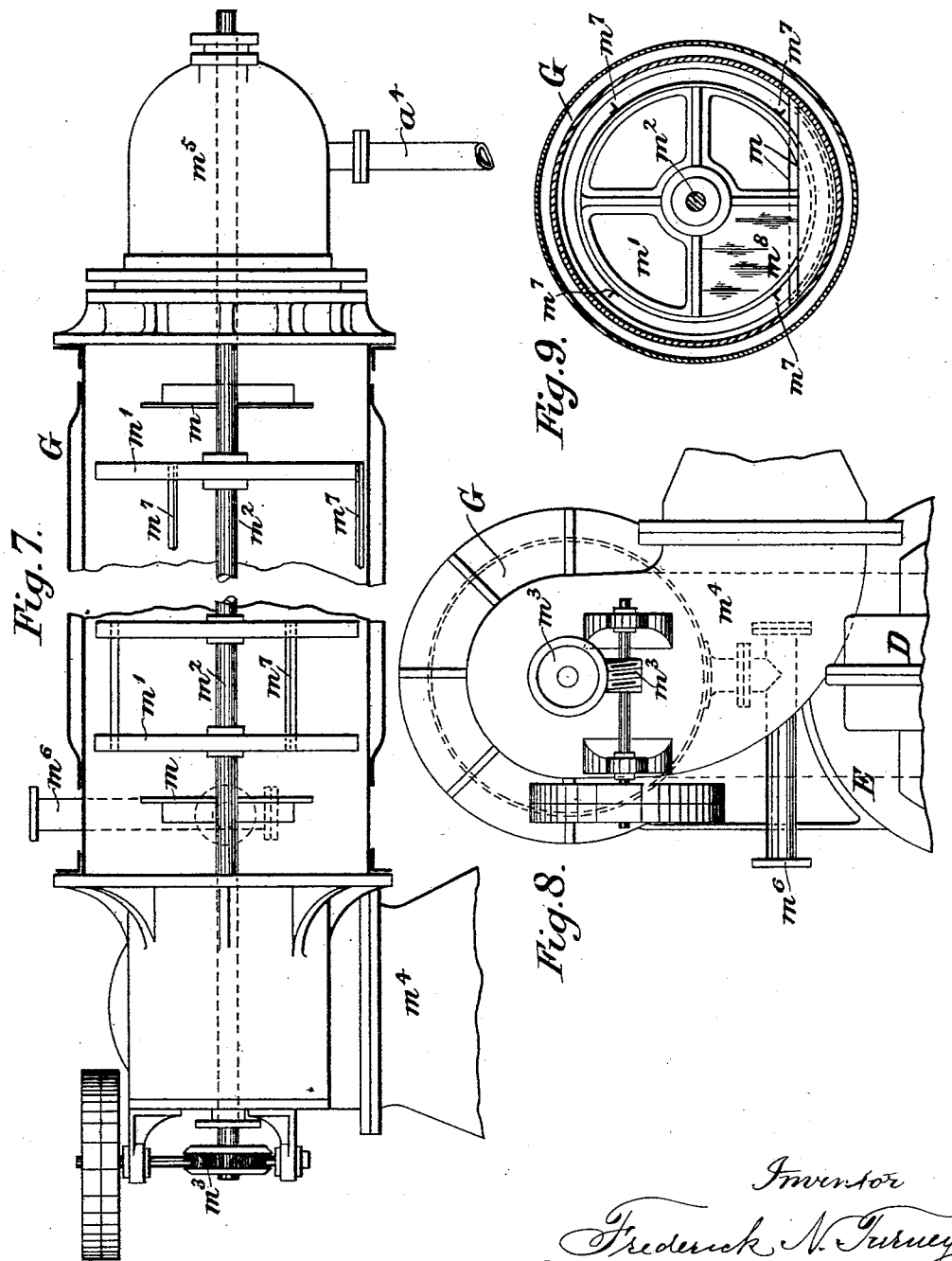

(No Model.)  7 Sheets—Sheet 7.

F. N. TURNEY.
APPARATUS FOR EXTRACTING FAT FROM WOOL.

No. 573,727.  Patented Dec. 22, 1896.

Witnesses
Chas. H. Smith
J. Staib

Inventor
Frederick N. Turney
per L. W. Serrell & Son
Attys

UNITED STATES PATENT OFFICE.

FREDERICK NICHOLSON TURNEY, OF NOTTINGHAM, ENGLAND.

APPARATUS FOR EXTRACTING FAT FROM WOOL.

SPECIFICATION forming part of Letters Patent No. 573,727, dated December 22, 1896.

Application filed May 28, 1896. Serial No. 593,399. (No model.)

*To all whom it may concern:*

Be it known that I, FREDERICK NICHOLSON TURNEY, a subject of the Queen of Great Britain and Ireland, residing at Nottingham, England, have invented certain new and useful Improvements in Apparatus for Degreasing and Cleansing Wool, Cotton-Waste, and Like Materials, of which the following is a specification.

This invention relates to improvements in the method of and apparatus for degreasing and cleansing wool, cotton-waste, and like materials, described in my former specification, Serial No. 567,637, filed November 1, 1895.

According to my present improvements, instead of winding up the material between the convolutions of a band I find it advantageous when such material is of short staple to feed it into the apparatus loosely or in bulk and to provide means inside such apparatus for delivering it to the solvent-tanks in the form of a layer or sliver or in successive short layers or slivers. Furthermore, instead of employing perforated endless traveling aprons or sheets for carrying the material through the solvent-tanks I arrange in such tanks false bottoms or trays to support the material during the beating or stamping operation and along which the material is fed or advanced by means of rakes and forks carried, in combination with the beaters or stamps, on frames having a to-and-fro or shogging motion. I also dispense with the endless bands for transporting the material in the drying-chamber and substitute therefor perforated trays having a compound motion—i. e., a combined to-and-fro and up-and-down movement—imparted to them by suitable means, and, lastly, I provide an improved form of evaporator for separating the volatile solvent from the sludge, grease, or oil withdrawn from the solvent-tanks.

Figure 10:
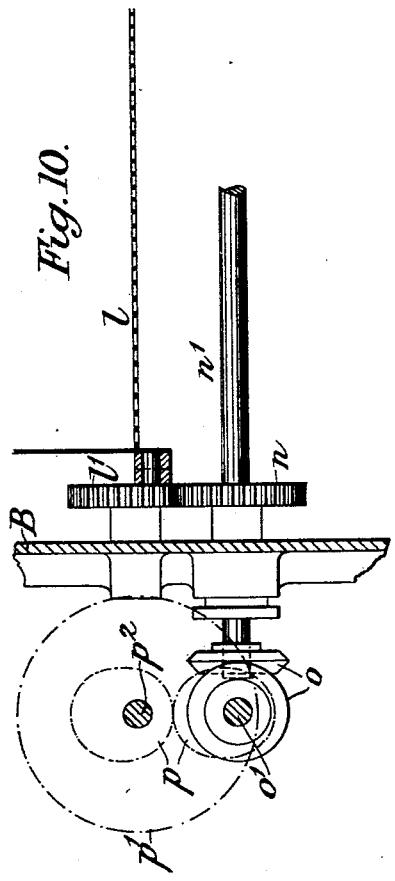
Figure 11:
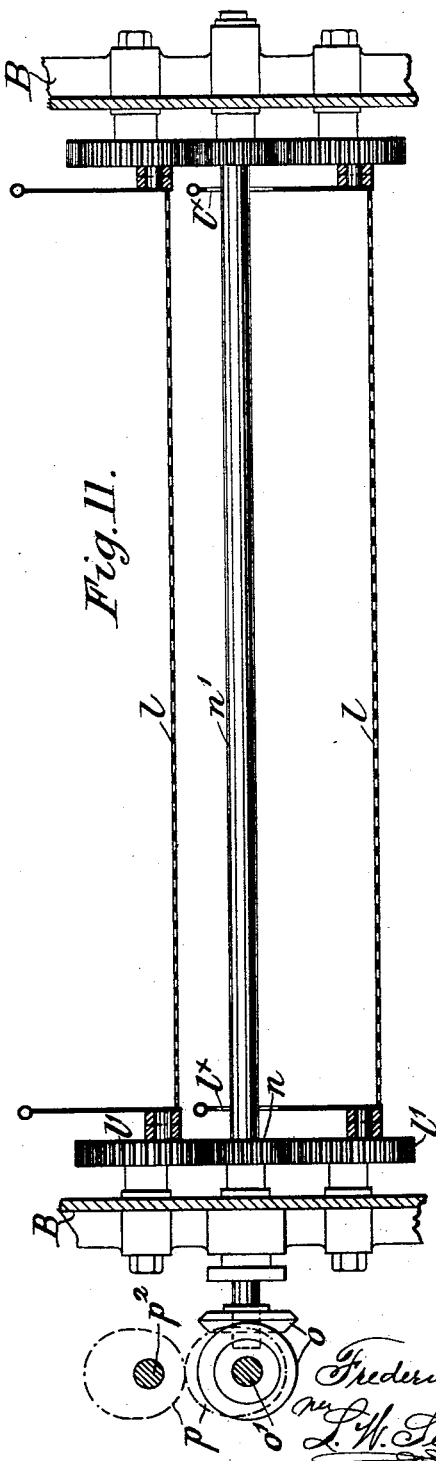

In the accompanying drawings, which readily explain my improvements, Figure 1 is a part sectional elevation, Fig. 2 a plan, and Fig. 3 an end elevation, of my improved apparatus, certain parts being omitted in Fig. 1 for the sake of clearness. Fig. 4 is a longitudinal section on an enlarged scale, showing the end portions of the degreasing-chamber I employ in this arrangement. Figs. 5 and 6 are longitudinal and transverse sections, respectively, also to a larger scale, showing the stamps or beaters and the rakes and forks, together with the mechanism for operating them. Figs. 7, 8, and 9 are respectively a part sectional plan, end view, and cross-section of the evaporator above mentioned. Fig. 10 illustrates gear for operating the trays in the drying-chamber, and Fig. 11 is a modification.

The entrance air-lock $A'$ is, for the object in view, in the form of a vertical shaft or trunk, and is provided with sliding doors $g$ and $g'$, operated by rack-and-pinion mechanism $g^2$ $g^3$. $g^4$ is a hopper arranged above and opening into the air-lock, the door $g$ serving to shut off communication between the two. The said hopper is adapted to hold enough loose material to fill the air-lock. Between this latter and the degreasing-chamber A is an intermediate chamber $A^3$, in which is arranged an elevator, such as a belt $g^5$, passing over pulleys $g^6$, and provided with spikes to cause it to lift the material. The pulleys $g^6$ are driven by bevel-gear $k^\times$ from a rotary shaft $k^{10}$. A suitable leveling device, for instance, a beater $g^7$, is provided to form the material on the belt into a layer of approximately uniform thickness.

When the hopper is filled, its contents are transferred to the air-lock $A'$ by drawing back the upper door $g$, the lower door $g'$ having been previously closed. From the air-lock the material can be passed into the intermediate chamber $A^3$ by drawing back the door $g'$, but care must be taken not to open either door until after the other one has been closed, and suitable interlocking mechanism may be provided to insure this, if desired.

From the elevator $g^5$ the material falls through an opening $b^5$ over a ledge $a^6$ (see Fig. 5) into the first of the solvent-tanks $a$, which tanks are shallower than those before used by me, and have a central well, into which their converging sides lead, while each of them has a perforated false bottom $a^5$ in place of the endless bands. Upon these false bottoms the material is beaten or stamped, during which time it is fed forward step by step by rakes or tines $h$, and at their ends where the material leaves them they are curved upwardly, as more clearly shown at $a^{14}$ in Fig. 5, to direct the material to the squeezing-rolls $a^8$, whose axles pass out through stuffing-boxes in the walls of the degreasing-chamber, and are driven by worm-wheels $k^9$ from the shaft $k^{10}$. The material is raised up these curved ends $a^{14}$ by rocking forks $i$, operated as hereinafter described.

The beaters or stamps $d$, rakes $h$, and rocking forks $i$ are all carried by frames $d'$, secured to channel-bars $k$, extending the whole length of the chamber and resting on rollers $k'$, running on suitably-supported rails $k^2$. A reciprocating or shogging motion is imparted to the said channel-bars and frames from outside the degreasing-chamber by means of a rod $k^3$, passing through stuffing-boxes $k^4$ and coupled by connecting-rods $k^5$ to crank-pins on disks $k^6$, mounted on a shaft $k^7$, driven through suitable gear from a pair of fast and loose pulleys $k^8$.

The beaters or stamps of each set are worked by cams or wipers $d^2$ on a shaft $d^3$, as in my aforesaid prior specification. Owing to the shogging movement of the beater-frame $d'$, a different arrangement is employed for operating the shaft $d^3$. For this purpose a main shaft $d^{15}$, which operates all the sets of beaters, extends along the degreasing-chamber A and passes out through a stuffing-box $d^{16}$ in the end wall thereof. This shaft partakes of the shogging motion, and its bearings are so shaped as to permit of this. It is driven by a bevel-pinion $d^{17}$ at its outer end, having a feather-and-slot connection with it, so that while it is free to slide to and fro through the boss of the pinion it is always in rotary connection therewith. The pinion $d^{17}$ gears with a corresponding pinion $d^{18}$ on the aforesaid shaft $k^7$.

Motion for operating the beaters is transmitted from the main shaft $d^{15}$ to the wiper-shafts $d^3$ by spur-wheels $d^{19}$ $d^{20}$, which either are directly in gear or have an idle-pinion $d^{21}$ between them in cases where the motion would not be in the proper direction. (See Fig. 6.)

The rakes or tines $h$ for feeding forward the material are kept raised during the backward movement of the beater-frames and are allowed to descend at the beginning of their forward movements to catch the material and push it forward. These up and down movements are obtained from the main shaft $d^{15}$ by cams $h'$, actuating their respective rakes through the intervention of a rocking arm $h^2$ and connecting-link $h^3$. Guide-rods $h^4$, working in guides $h^5$, insure the regular movement of the rakes. The rocking forks $i$ also partake of these up and down movements, for which purpose the shafts $i$, on which they are carried, pass through bearings fitted in supporting-brackets $i^2$, secured to the guide-rods $h^4$ of the rakes. These brackets $i^2$ are of rectangular form, so that during the shogging movement they slide over the bearings of the shafts $i'$, but when the rakes move up or down they carry the shaft-bearings with them. The said shafts $i'$ of the rocking forks are restrained from to-and-fro movement by means of vertical guides $i^3$, in which, however, they are free to rise and fall. As they can thus only move in one plane, the rocking motion can readily be imparted to them by means of a connecting-rod $i^4$, attached to the frame $d'$. Their action will be readily understood. As shown in Fig. 5, they are in their lowest position and the beater-frame $d'$ is shogged back. When, however, the frame moves forward, the connecting-rod $i^4$ will cause the forks $i$ to swing up to the top of the curve $a^{14}$, carrying the material with them, which is then swept by a doffer $i^5$ to the squeezing-rolls $a^8$. Before the frame $d'$ shogs back the rakes $h$, and with them the shafts of the rocking forks, are raised into their highest position, so that when the rearward motion of the frame takes place and the rocking forks swing back again their tips pass clear above any material that has been pushed forward by the rakes and into such a position that at the next descent of the rakes they pass down into and engage such material. By these means the material, while being beaten, is fed forward successively through the whole of the tanks, and is wrung or squeezed on leaving each tank.

After leaving the last set of squeezing-rolls $a^8$ the material falls down the shaft or trunk C into the drying-chamber B and onto the upper of two horizontal trays $l$, (although a greater number may be employed,) having bottoms of perforated zinc or wire-net, on which it is dried by the current of heated air. These trays are supported on crank-pins secured to crank-disks $l'$, so that as the disks revolve they receive a to-and-fro as well as an up-and-down movement. The crank-disks turn more quickly during one part of their revolution than during the other part, so as to throw the material forward upon the trays. This variable speed can be imparted by any suitable means, such, for example, as the elliptical gear shown in Figs. 10 and 11. As shown in these figures, the crank-disks $l'$ have spur-teeth, and are driven by a spur-wheel $n$ upon the shaft $n'$, which is rotated by miter-wheels $o$ from the counter-shaft $o'$, and this, in turn, is driven from the elliptical gearing $p$ and the driving-pulley $p'$ on the shaft $p^2$. In Fig. 10 this driving-gear operates a single tray only, so that where two trays are employed two sets of driving mechanism would be required. In Fig. 11, however, this is avoided by causing the toothed disks $l'$ of each tray to engage with a single spur-wheel $n$. As this requires the trays to be closer together, the shaft $n'$ may be arranged to pass through apertures $l^\times$ in the side walls of the lower tray.

The heated air enters the drying-chamber by a pipe $e^\times$ from the fan or blower D and leaves it by an opening $e^2$, and after passing through the evaporator G, hereinafter described, it is led to the condenser F, wherein the solvent with which it is loaded is condensed and recovered, and from which it passes through the pipe $w$ into a tank, whence it is pumped back into the degreasing-chamber, while the air is drawn by the fan into the air-heater E, being thus caused to circulate continuously, as in my former specification, and being caused, by the horizontal partition $e$, to flow along the drying-chamber and back again over or through the material in the trays, as indicated by the arrows.

After leaving the lower tray the material passes to the exit air-lock $B^2$ by means of the endless vertical belts $f$, as described in my aforesaid prior specification.

The used and dirty solvent and sludge are withdrawn from the tanks $a$ and led by pipes $a^4$ to the steam-jacketed cylindrical evaporator G, along the bottom of which it flows, the rate of flow being checked by a series of transverse segmental plates $m$ of gradually-decreasing height if the evaporator be arranged horizontally, but of equal height if it be inclined. Wheels $m'$ or other suitable means may be provided to keep the sludge agitated, and they may be mounted on a shaft $m^2$, driven by a worm and worm-wheel arrangement $m^3$. There may be two or more such wheels disposed between each pair of the segmental plates $m$ and connected together by angle-irons $m^7$, which act as scrapers and agitate the sludge. A plate or baffle $m^8$ is fixed between two of the arms of each wheel to prevent the solvent vapor passing in a straight line through the evaporator. The solvent distils off from the sludge as it flows through the evaporator and is withdrawn by a current of heated air passing in the opposite direction to the sludge. This air is the same which has been used in the drying-chamber. It enters the evaporator by the trunk $m^4$ and leaves it by the corresponding trunk $m^5$, through which it passes to the condenser F, thence to the heater E and the fan D, by which it is returned to the drying-chamber B, so circulating continuously, as previously stated. The grease, oil, and sludge remaining after the solvent is distilled off are withdrawn by a waste-pipe $m^6$.

Having now described my invention, what I claim is—

1. In apparatus for degreasing and cleansing wool, cotton-waste and like materials, the combination with a series of solvent-tanks, of an entrance air-lock provided with a hopper to receive the material in a loose form, a vapor-tight chamber arranged between said air-lock and tanks, and in communication with both of them, an endless belt armed with spikes or teeth for raising the material from the lower part of the chamber to the first of the tanks, and a leveling device at the upper part of the belt for forming the material into a continuous or practically continuous sheet or layer, substantially as described.

2. In apparatus for degreasing and cleansing wool, cotton-waste and like materials, the combination of beaters, shogging-frames carrying said beaters, rakes and rocking forks for advancing or feeding forward the materials, and means for operating said beaters, rakes, and forks, substantially as described.

3. In apparatus for degreasing and cleansing wool, cotton-waste, and like materials, the combination of the drying-chamber, perforated rocking trays in said chamber, crank-disks carrying said trays, and means for driving said crank-disks with a variable speed, substantially as described.

4. In apparatus for degreasing and cleansing wool, cotton-waste, and like materials, the steam-jacketed evaporator having transverse segmental partitions $m$ and revolving wheels $m'$ carrying scrapers $m^7$, and baffle-plates $m^8$, substantially as and for the purposes described.

5. In apparatus for degreasing and cleansing wool, cotton-waste, and like materials, the combination of a degreasing-chamber, beaters, rakes, and forks in said degreasing-chamber, a vertical entrance air-lock, sliding doors at the upper and lower ends thereof, an intermediate chamber between said entrance air-lock and degreasing-chamber, an elevator in said intermediate chamber, a hopper above said air-lock, a drying-chamber connected with said degreasing-chamber, rocking trays in said drying-chamber, mechanism for operating said trays, an exit air-lock for removing the dried material, and means for transferring the material from the drying-chamber to the exit air-lock, substantially as described.

6. In apparatus for degreasing and cleansing wool, cotton-waste, and like materials, the combination of a degreasing-chamber, solvent-tanks in said degreasing-chamber, perforated false bottoms in said tanks, beaters for beating the material, rakes and forks for advancing the material, a shogging-frame carrying said beaters, rakes, and forks, means for operating the same, a vertical entrance air-lock, sliding doors at the upper and lower ends thereof, an intermediate chamber between said entrance air-lock and degreasing-chamber, an elevator in said intermediate chamber, a hopper above said air-lock, and means for drying the material, and for recovering the used solvent, substantially as described.

In witness whereof I have hereunto signed my name in the presence of two subscribing witnesses.

FREDERICK NICHOLSON TURNEY.

Witnesses:
 ALFRED CLARKE,
 WILLIAM COOPER.